United States Patent
He et al.

(10) Patent No.: US 11,514,726 B2
(45) Date of Patent: Nov. 29, 2022

(54) SYSTEMS AND METHODS FOR INTEGRATING CAMERAS AND PHASED ARRAY ANTENNAS FOR USE IN ELECTRONIC TOLL CHARGE

(71) Applicant: Analog Devices International Unlimited Company, County Limerick (IE)

(72) Inventors: Hailong He, Nanjing (CN); Tairan Sun, Shanghai (CN); Xiaoyuan Liu, Beijing (CN); Fan Yang, Shanghai (CN); Linyue Wang, Beijing (CN)

(73) Assignee: Analog Devices International Unlimited Company, Limerick (IE)

( * ) Notice: Subject to any disclaimer, the term of this patent is extended or adjusted under 35 U.S.C. 154(b) by 139 days.

(21) Appl. No.: 17/029,771

(22) Filed: Sep. 23, 2020

(65) Prior Publication Data
US 2022/0092883 A1 Mar. 24, 2022

(51) Int. Cl.
| | |
|---|---|
| H04B 7/06 | (2006.01) |
| G07B 15/00 | (2011.01) |
| H04N 7/18 | (2006.01) |
| H01Q 3/36 | (2006.01) |
| G07B 15/06 | (2011.01) |

(52) U.S. Cl.
CPC .......... *G07B 15/00* (2013.01); *G07B 15/063* (2013.01); *H01Q 3/36* (2013.01); *H04B 7/0617* (2013.01); *H04B 7/0691* (2013.01); *H04N 7/18* (2013.01); *G06Q 2240/00* (2013.01)

(58) Field of Classification Search
CPC .................................................... H04B 7/0617
See application file for complete search history.

(56) References Cited

U.S. PATENT DOCUMENTS

| | | | |
|---|---|---|---|
| 6,683,580 B2 | 1/2004 | Kuramoto | |
| 8,233,043 B2 | 7/2012 | Washington | |
| 10,440,587 B2* | 10/2019 | Kim | .................. G01S 7/003 |
| 10,446,972 B2* | 10/2019 | Ono | .............. H01R 13/5202 |

(Continued)

FOREIGN PATENT DOCUMENTS

| | | |
|---|---|---|
| AU | 2003 232221 A1 | 11/2003 |
| CN | 102956958 A | 3/2013 |

(Continued)

OTHER PUBLICATIONS

Baek, Jong Jin, et al. "Camera-integrable wide-bandwidth antenna for capsule endoscope." *Sensors* 20.1 (2020): 232, 7 pages.

*Primary Examiner* — Kevin Kim
(74) *Attorney, Agent, or Firm* — Knobbe, Martens, Olson & Bear, LLP

(57) ABSTRACT

Systems and methods for integrating cameras and phased array antennas for use in electronic toll charge (ETC) are disclosed. In one aspect, an ETC system includes a camera including a lens and configured to capture an image indicative of a position of a vehicle and a plurality of antennas formed in a ring around the lens of the camera. The system further includes control circuitry configured to: determine the position of the vehicle based on the image captured by the camera, adjust the antennas for beamforming based on the position of the vehicle, and wirelessly communicate with an on board device (OBU) of the vehicle via the beamforming provided by the adjusted antennas.

20 Claims, 13 Drawing Sheets

(56) References Cited

U.S. PATENT DOCUMENTS

| | | |
|---|---|---|
| 10,862,459 B2 | 12/2020 | Saha |
| 2010/0065638 A1 | 3/2010 | Kim |
| 2011/0063011 A1 | 3/2011 | Barlow |
| 2018/0075746 A1* | 3/2018 | Jiang ................... H04L 12/12 |
| 2018/0196135 A1 | 7/2018 | Crain et al. |
| 2019/0372540 A1 | 12/2019 | Muralidharan |
| 2020/0077279 A1 | 3/2020 | Foerster et al. |
| 2020/0196250 A1* | 6/2020 | Marcone ............. H04W 52/365 |
| 2020/0235800 A1* | 7/2020 | Tang ................... H04B 7/0695 |
| 2020/0382088 A1 | 12/2020 | Saha |
| 2021/0021959 A1* | 1/2021 | MacNeille ............... H01Q 3/36 |

FOREIGN PATENT DOCUMENTS

| | | | |
|---|---|---|---|
| CN | 203186238 U | 9/2013 | |
| CN | 209962291 U | 1/2020 | |
| CN | 210721573 U | 6/2020 | |
| DE | 10 2012 016 862 A1 | 2/2014 | |
| DE | 10 2015 210 449 B4 | 6/2017 | |
| EP | 3352507 A2 * | 7/2018 | .......... H04B 7/0617 |
| JP | 2006-287650 A | 10/2006 | |
| JP | 2008-108146 A | 5/2008 | |
| JP | 2008-117209 A | 5/2008 | |
| JP | 4237509 B2 | 3/2009 | |
| JP | 4347032 B2 | 10/2009 | |
| JP | 2009-302717 A | 12/2009 | |
| JP | 5057750 B2 | 10/2012 | |
| JP | 5351466 B2 | 11/2013 | |
| WO | WO 03/094373 | 11/2003 | |
| WO | WO 2007/135488 | 11/2007 | |
| WO | WO 2015/075072 | 5/2015 | |
| WO | WO 2015/075072 A1 | 5/2015 | |
| WO | WO 2019/077231 | 4/2019 | |
| WO | WO 2020/098283 | 5/2020 | |

\* cited by examiner

— 1 —

SYSTEMS AND METHODS FOR INTEGRATING CAMERAS AND PHASED ARRAY ANTENNAS FOR USE IN ELECTRONIC TOLL CHARGE

FIELD OF THE DISCLOSURE

Embodiments of the invention relate to electronic systems, and more particularly to, systems and methods for integrating phased array antennas into an electronic toll charge (ETC) camera system.

BACKGROUND

Electronic Toll Charge (ETC, also referred to as Electronic Toll Collection) systems are wireless systems including a transceiver (generally referred to as an ETC device or ETC system) which uses an antenna to transmit a radio-frequency (RF) signal to an on board device (OBU) transponder installed on a vehicle. The OBU in turn transmits a signal back to the ETC device which can be used to charge a payment account associated with a user of the OBU for payment.

The usage of ETC, in particular in China, has been increasing rapidly recently. The number of cars with OBU installed thereon in China increased from 80 million to 200 million in 2019. Such systems are gaining popularity and the usage of ETC payments are being expanded from highway toll usage to including city usage, including payment for parking, short message broadcasting, and vehicle surveillance.

SUMMARY OF THE DISCLOSURE

The methods and devices of the described technology each have several aspects, no single one of which is solely responsible for its desirable attributes.

In one aspect, there is provided an electronic toll charge (ETC) system, comprising: a camera comprising a lens and configured to capture an image indicative of a position of a vehicle; a plurality of antennas formed in a ring around the lens of the camera; and control circuitry configured to: determine the position of the vehicle based on the image captured by the camera, select a plurality of beamforming settings of the antennas based on the position of the vehicle, and wirelessly communicate with an on board device (OBU) of the vehicle with the selected beamforming settings of the antennas.

In another aspect, there is provided a phased array, comprising: a printed circuit board (PCB) having a hole configured to be aligned with a lens of a camera; a plurality of antennas formed on the PCB and formed in a ring around the hole; and control circuitry configured to: determine the position of a vehicle based on an image captured by the camera, select a plurality of beamforming settings of the antennas based on the position of the vehicle, and wirelessly communicate with an on board device (OBU) of the vehicle with the selected beamforming settings of the antennas.

In yet another aspect, there is provided a method for wireless electronic toll charge (ETC) communication, the method comprising: receiving an image indicative of a position of a vehicle captured by a camera comprising a lens; determining the position of the vehicle based on the image; selecting a plurality of beamforming settings of a plurality of antennas based on the position of the vehicle, the plurality of antennas formed in a ring around the lens of the camera; and wirelessly communicating with an on board device (OBU) of the vehicle with the selected beamforming settings of the antennas.

BRIEF DESCRIPTION OF THE DRAWINGS

These drawings and the associated description herein are provided to illustrate specific embodiments of the invention and are not intended to be limiting.

DETAILED DESCRIPTION

Figure 1:
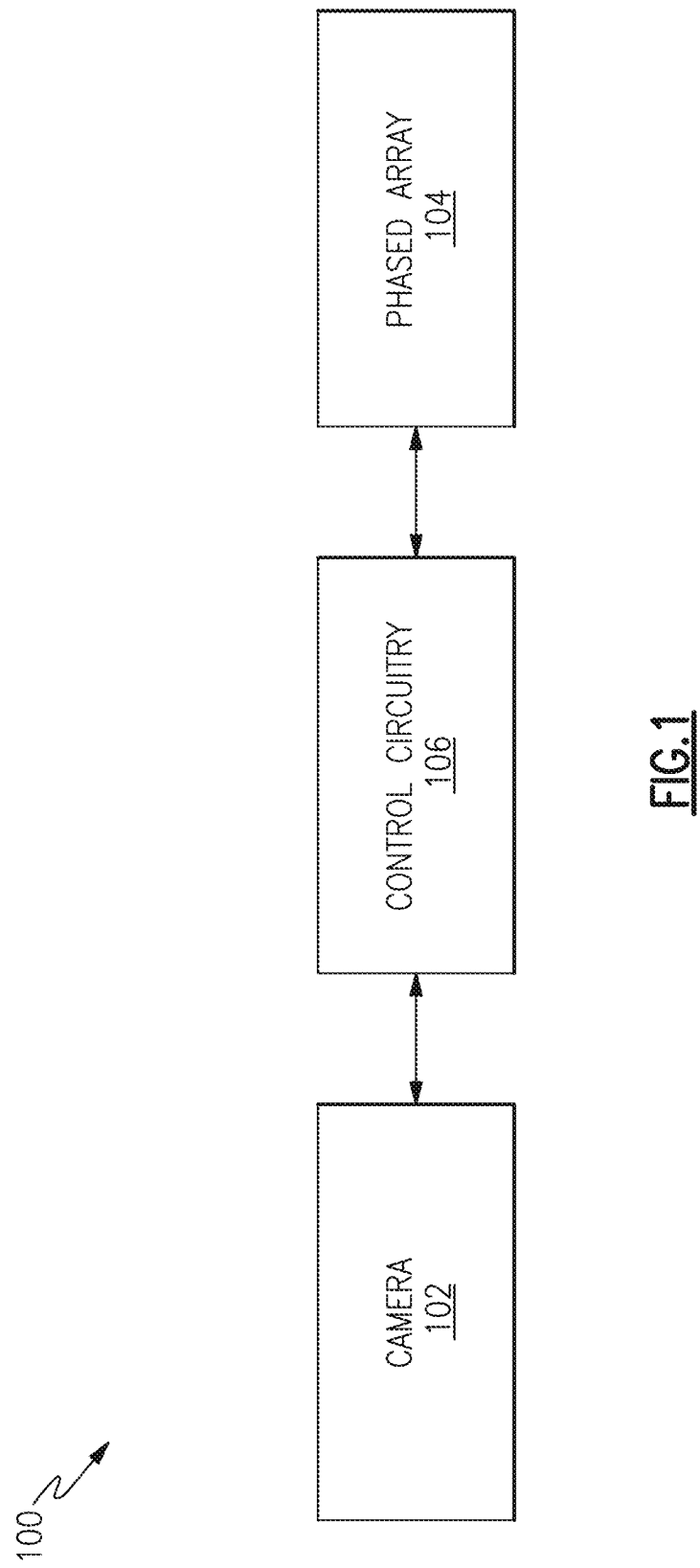
FIG. 1 is an example block diagram of an ETC system in accordance with aspects of this disclosure.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Overview of Integrated Camera and Phased Array Systems

It is desirable for ETC roadside units (RSUs) to have additional capabilities, such as the inclusion of a phased array ETC function and integrated camera which could be deployed widely within city limits. It is also desirable for such an integrated camera/ETC system to simply replace a currently installed camera without the need for additional calibration needed in the field.

As described above, the ETC device is configured to transmit an RF signal to an OBU transponder installed on a vehicle, which in turn transmits a signal back to the ETC device in order to charge a payment account associated with a user of the OBU for payment. When used in the comparatively more congested environment of a city, parking lot, etc., it may be more difficult for the ETC device to detect a single OBU since there may be more than one vehicle/OBU within range of the ETC device. For example, a number of OBUs may be present within the communication range of the ETC device, which can make it difficult for the ETC device to communicate with a single OBU at a time.

To overcome these issues, it is desirable to integrate a camera and a phased array antenna into an ETC device which, in combination, can be used to identify the location of a vehicle with an OBU within the field of view of the camera and use beamforming via the phased array antenna to direct the transmit and receive beams of the phased array antenna towards the location of the detected vehicle/OBU. In certain aspects, the integrated camera may be configured to detect the location(s) of one or more vehicle(s) within the camera's field of view, and then control the phased array antenna to direct an RF beam to one of the detected vehicle(s), thereby avoiding interference with any other OBU's in the communication range of the phased array antenna.

Aspects of this disclosure relate to a phase array antenna and transceiver-based ETC device with an integrated camera, which may provide a relatively small size solution compared to traditional multi-vehicle ETC systems.

Traditional high performance phased array ETC systems which can be used to cover different vehicles and multi-lanes are much larger than typical cameras, and thus, cannot be directly integrated into a camera to provide a single combined camera/ETC system without significantly increasing the size of the ETC system. In addition, such a system would typically require additional beam calibration when deployed into the field.

OBU based system on a chip (SoC) is one example technique that can be used to reduce the size of a printed circuit board (PCB) to a size that can be integrated into the camera of an ECT system using a single element antenna. However, these techniques do not support phased array ETC functionality, and thus, cannot cover different vehicles/OBUs and multi-lanes.

FIG. 1 is an example block diagram of an ETC system 100 in accordance with aspects of this disclosure. As shown in FIG. 1, the ETC system 100 includes a camera 102, a phased array 104 formed of a plurality of antennas, and control circuitry 106. The control circuitry 106 may be configured to control each of the camera 102 and the phased array 104 in order to wirelessly communicate with a selected vehicle within a field of view of the camera 102. Although not illustrated in FIG. 1, in a number of implementations, the phased array 104 may be integrated into the camera 102 to provide a relatively small sized system 100 compared to traditional phased array ETC systems. The phased array 104 is also referred to herein as a phase antenna array or an electronically scanned antenna array.

Figure 2:
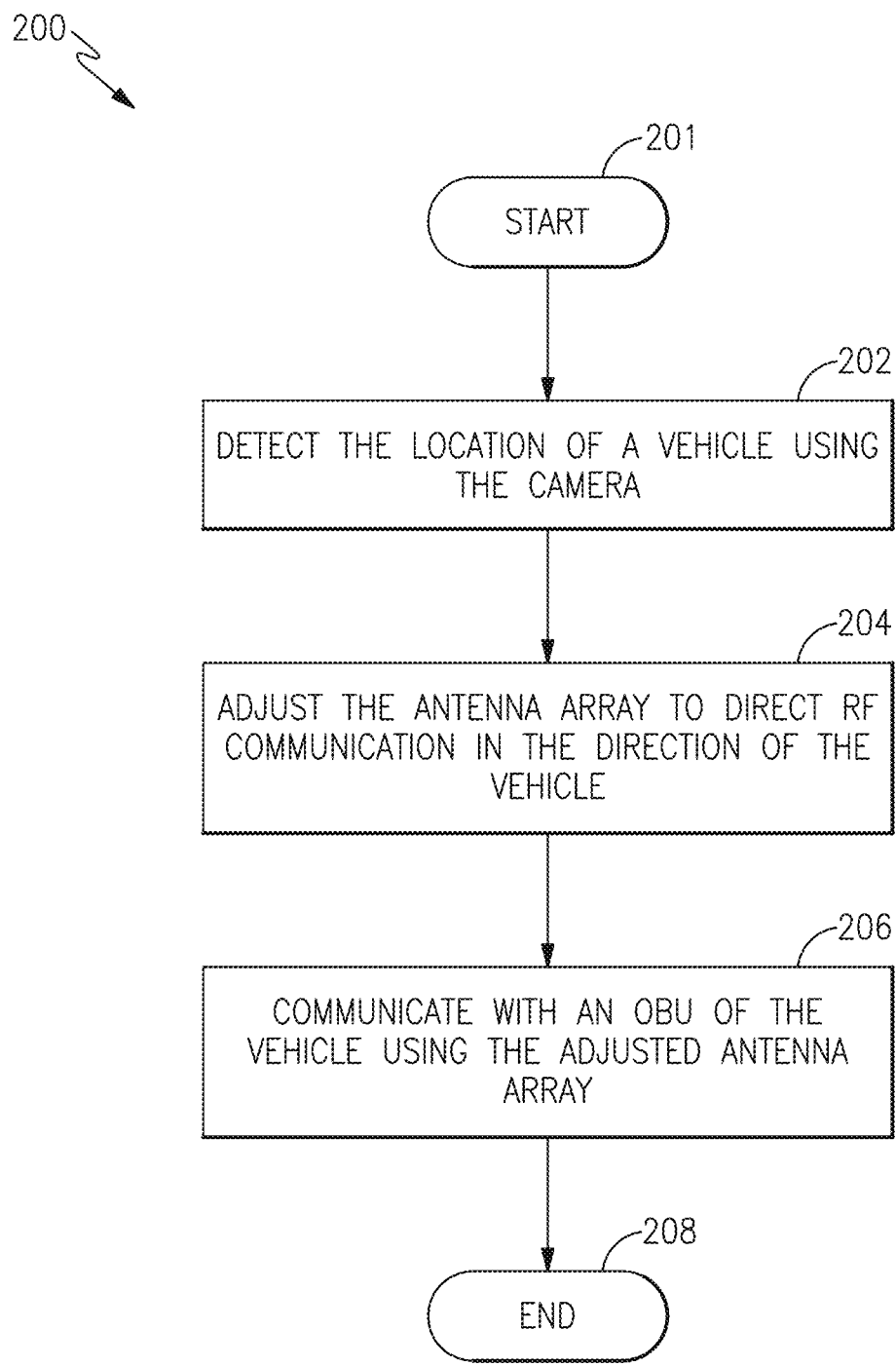
FIG. 2 is a flowchart illustrating a method that can be performed by the control circuitry of an ETC system in accordance with aspects of this disclosure.

FIG. 2 is a flowchart illustrating a method 200 that can be performed by the control circuitry 106 of an ETC system 100 in accordance with aspects of this disclosure. As shown in FIG. 2, the method 200 begins at block 201.

At block 202, the control circuitry 106 may detect the location of a vehicle (e.g., see the vehicle 116 of FIG. 14) using the ETC system's 100 camera 102. At block 204, the control circuitry 106 may adjust the phased array 104 (by controlling beamforming settings) to direct RF communication in the direction of the vehicle (e.g., using beamforming). For example, the control circuitry 106 may adjust a gain and/or phase of the RF signals associated with each antenna or each group of antennas within the phased array to perform beamforming, and thereby direct RF communication in the direction of the vehicle.

For example, with respect to signal transmission, the RF signal waves radiated from the antennas of the phased array 104 aggregate through constructive and destructive interference to collectively generate a transmit beam having a particular direction. With respect to signal reception, a receive beam is generated by combining the RF signals received from the antennas of the phased array 104 after amplitude scaling and phase shifting.

At block 206, the control circuitry 106 may communicate with an OBU (e.g., see the OBU 118 of FIG. 14) of the vehicle using the adjusted phased array 104. For example, the control circuitry 106 may perform the traditional ETC communications between the ETC system 100 and the OBU using the adjusted beam in order to charge a payment account associated with a user of the OBU for payment.

In summary, the method 200 may involve first detecting a vehicle location using the camera 102, adjusting the antenna beam via the phased array 104 to the detected vehicle location, and completing the ETC process using the adjusted beam. The method 200 ends at block 208.

Figure 3:
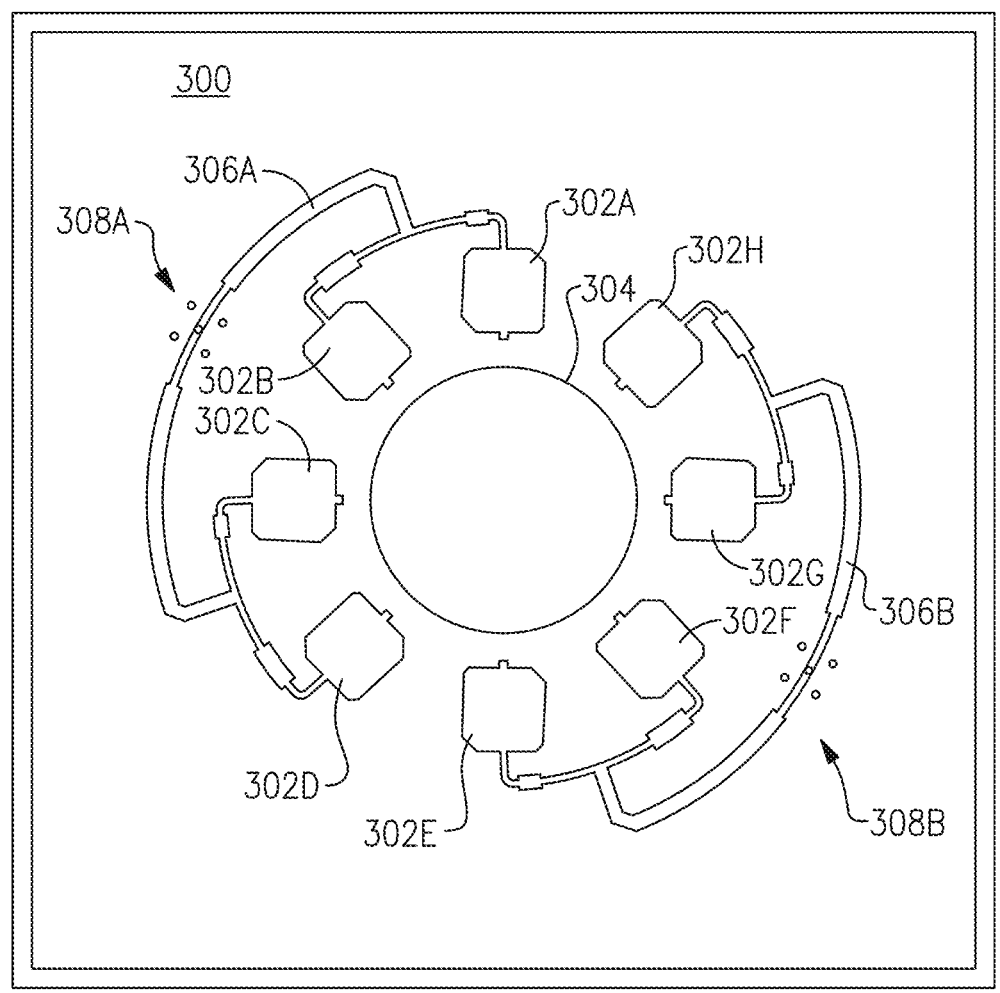
FIG. 3 illustrates an example phased array which can be used in the ETC system of FIG. 1 in accordance with aspects of this disclosure.

FIG. 3 illustrates an example phased array 104 which can be used in the ETC system 100 of FIG. 1 in accordance with aspects of this disclosure. In particular, the phased array 104 illustrated in FIG. 3 may be implemented as a customized phased array 104 and transceiver-based multi-transmit (Tx) multi-receive (Rx) solution, which can be used to integrate the phased array 104 into the camera 102. In particular, the phased array 104 of FIG. 3 can be integrated with (for instance, installed on and/or in) the camera 102 to form the integrated camera/ETC system 100.

The phased array 104 illustrated in FIG. 3 includes a plurality of antennas 302A-302H formed on a printed circuit board (PCB) 300. More particular, the antennas 302A-302H are formed in a ring around a hole or aperture 304 formed in the PCB 300. The PCB 300 can be positioned such that the hole 304 is aligned with an aperture of the camera 102, thereby allowing light to pass through the hole 304 into the camera 102. The camera 102 may further include a lens (e.g., see lens 108 in FIG. 13) configured to focus light for capturing images within the field of view of the camera 102. This positioning of the PCB 300 with respect to the camera 102 also allows the ring of antennas 302A-302H to be substantially coaxial with the aperture of the camera 102.

Accordingly, this coaxial placement simplifies the directing of the beam formed by the array of antennas 302A-302H since the camera 102 and ring of antennas 302A-302H will be facing substantially the same direction. As shown in FIG. 3, the ring of the antennas 302A-302H may form a circle with the angular orientation of each of the individual antennas 302A-302H being rotated based on its position within the ring.

The antennas 302A-302H may also be divided into a plurality of antenna groups 308A and 308B. For example, antennas 302A-302D may be connected together using a first conductor 306A to form a first antenna group 308A and antennas 302E-302H may be connected together using a second conductor 306B to form a second antenna group 308B. The first conductor 306A can be implemented with branching that substantially matches a delay to each antenna in the first antenna group 308A. Likewise, the second conductor 306B can be implemented with branching that substantially matches a delay to each antenna in the second antenna group 308B. As is described in greater detail below, the antenna groups 308A and 308B can be used to direct the RF communication in the direction of the vehicle as determined by the camera 102.

Figure 4:
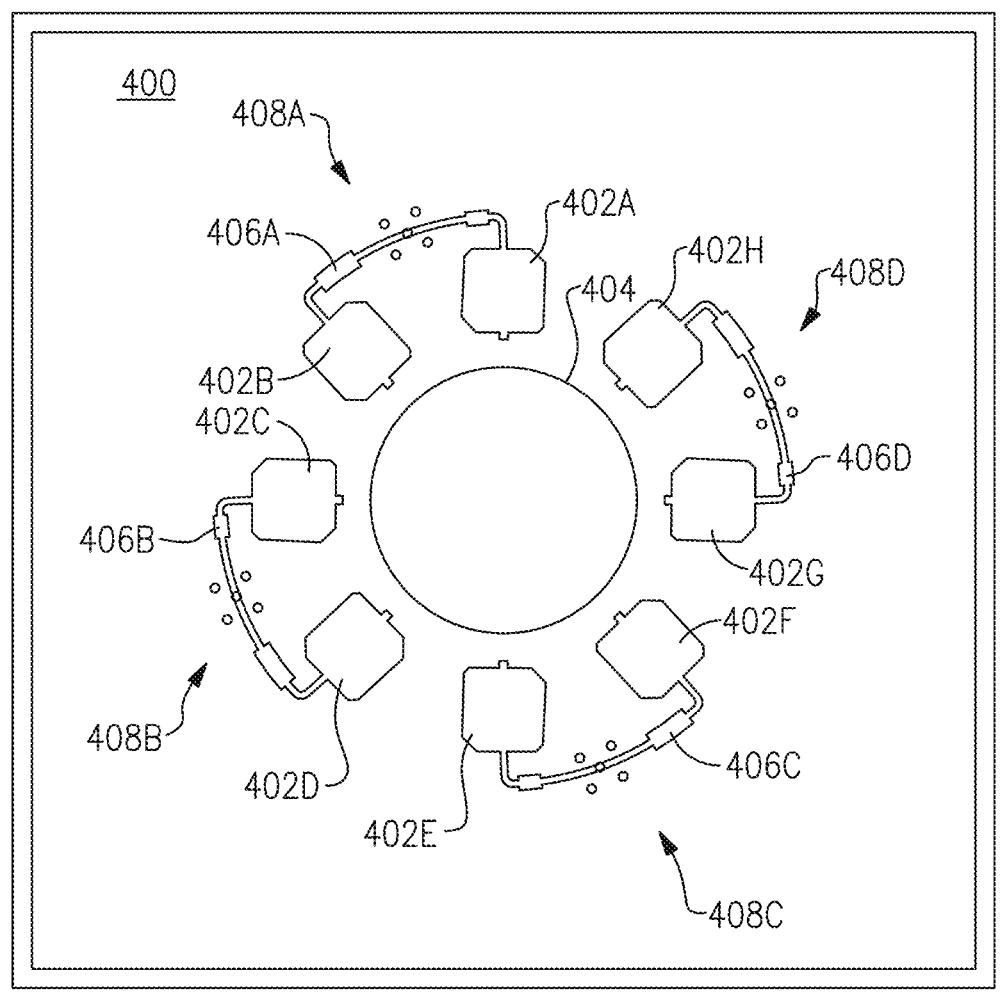
FIG. 4 illustrates another example phased array which can be used in the ETC system of FIG. 1 in accordance with aspects of this disclosure.

FIG. 4 illustrates another example phased array 104 which can be used in the ETC system 100 of FIG. 1 in accordance with aspects of this disclosure. Like the embodiment of FIG. 3, the phased array 104 illustrated in FIG. 4 may be implemented as a customized phased array 104 and transceiver-based multi transmit (Tx) multi receive (Rx) solution, which can be used to integrate the phased array 104 into the camera 102. The phased array 104 further includes a PCB 400 with a hole 404 at its center and a plurality of conductors 406A-406D, which divide the antennas 402A-402H into antenna groups 408A-408D. Thus, eight antennas are divided into four groups, in this example. The phased array 104 of FIG. 4 may have a similar structure to the phased array 104 of FIG. 3, and thus, a detailed description of similar elements may not be provided.

The antennas 402A-402H of the phased array 104 illustrated in FIG. 4 are formed in a ring around the hole 404 formed in the PCB 400. The antennas 402A-402H are also divided into the plurality of antenna groups 408A-408D, which can be used for beamforming in order to direct RF communications with an OBU of a detected vehicle.

In each of the embodiments illustrated in FIGS. 3 and 4, the phased array 104 is designed to have good directionality in both the horizontal direction and vertical direction. For example, the phase array 104 may be determined to have good directionality when the Half Power Beam Width (HPBW) is about 25° in both the horizontal and vertical directions. The phased arrays 104 are further designed to be placed over the camera's 102 shield glass, for example, such that the hole 304 and 404 of the phased array is substantially concentric with the camera's 102 aperture. Although not illustrated in FIGS. 3 and 4, the control circuitry 106 (e.g., which may be implemented as a feeder in certain embodiments) can be placed on the circuit board 300 or 400 outside of the ring formed by the antennas 302A-302H or 402A-402H. In other embodiments, the control circuitry 106 may be placed on a separate PCB. In certain embodiments, at least some of the antennas 302A-302H and 402A-402H may be implemented as patch antennas.

As described above, the center of the PCB 300 and 400 for each of the phased arrays 104 can be removed, allowing the lens of the camera 102 to be placed within or overlapping the opening 304 and 404 such that light can be transmitted to the camera 102. The circuit board 300 and 400 and/or the ring of antennas 302A-302H and 402A-402H may include one or more markings that indicate the center of the beam phase generated by the array of antennas 302A-302H and 402A-402H, thereby facilitating alignment of the optical center (e.g., see the optical center 114 of FIG. 13) of the camera 102 so as to coincide with the beam phase center, which may be beneficial for mass deployment of the phased array 104 in the field. When the antennas are arranged in a substantially circular ring, the beam phase center may be the center point of a circle formed by the antennas.

As shown in each of the FIGS. 3 and 4 embodiments, eight antenna elements 302A-302H and 402A-402H are illustrated as an example. In other implementations, the number of antennas may be greater or fewer, for example, there may be 6, 10, or 12 antennas in other implementations. The antenna elements can be arranged in groups of any size.

Figure 5:
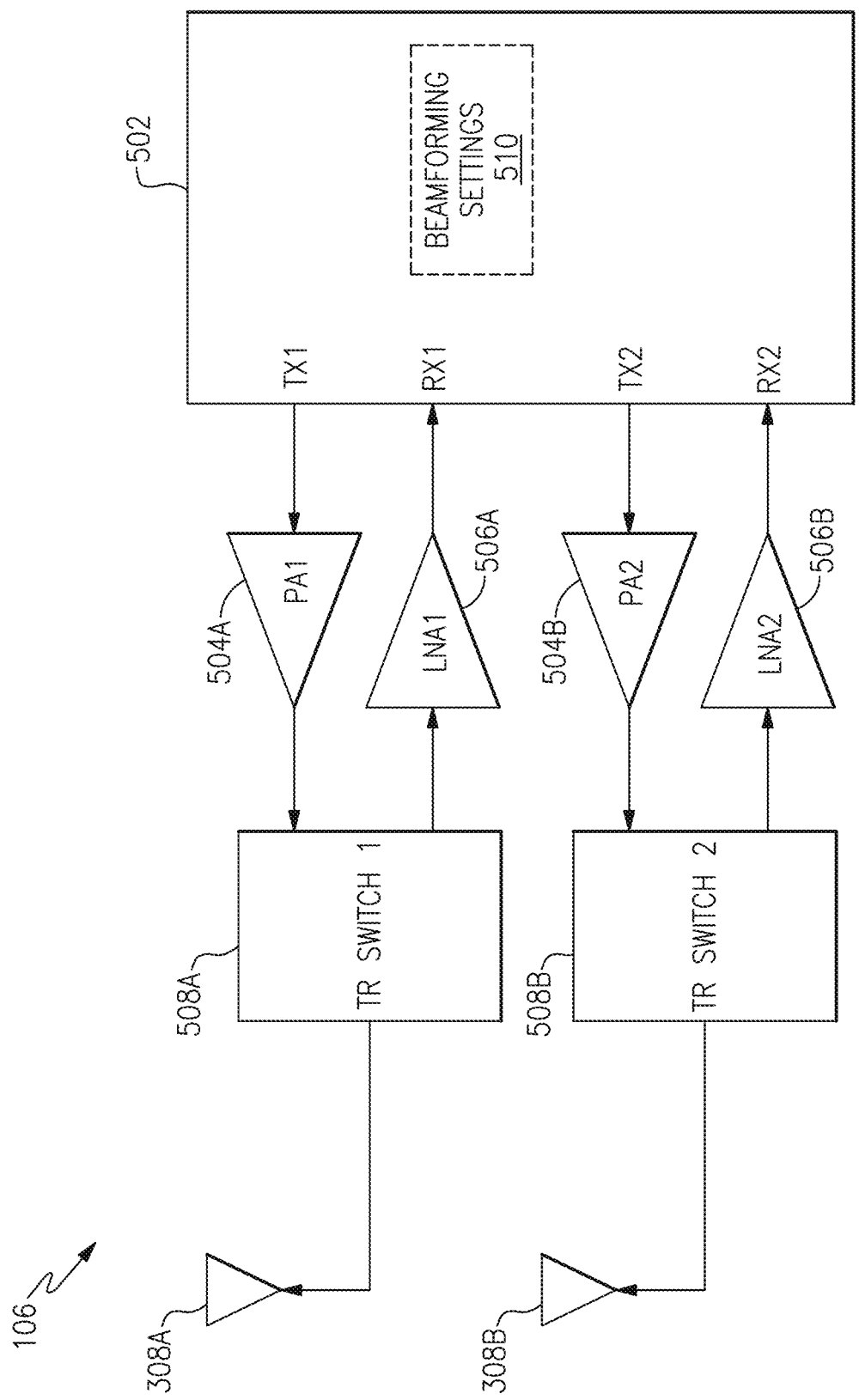
FIG. 5 is an example of control circuitry which can be used to drive the phased array of FIG. 3.

FIG. 5 is an example of control circuitry 106 which can be used to drive the phased array 104 of FIG. 3 (represented as antenna groups 308A and 308B in FIG. 5).

As shown in FIG. 5, the control circuitry 106 includes a transmit/receive (T/R) controller 502, a plurality of power amplifiers 504A and 504B, a plurality of low noise amplifiers 506A and 506B, and a plurality of T/R switches 508A and 508B. The T/R switches 508A and 508B are respectively connected to a corresponding one of the antenna groups 308A and 308B (e.g., illustrated in FIG. 3). In certain implementations, the T/R switches 508A and 508B can be implemented together as a two transmit, two receive (2T2R) on a single chip, such as a 5.8 G front end module (FEM).

The T/R controller 502 can be configured to set the gain and phase of the RF signal provided to and received from each of the antenna groups 308A and 308B based on beamforming settings 510 to provide beamforming based on the detected position of the vehicle. For example, with respect to signal transmission, the amplitude and phase of a first RF transmit signal provided to the power amplifier 504A is separately controllable from the amplitude and phase of a second RF transmit signal provided to the second power amplifier 504B. Additionally, with respect to signal reception, a first desired amount of gain and phase shifting is applied to a first RF receive signal from the low noise amplifier 506A, while a second desired amount of gain and phase shifting is applied to a second RF receive signal from the low noise amplifier 506B. The beamforming settings 510 may define the amplitude and phase to be applied to each of the RF signals (e.g., the first RF transmit signal, the first RF receive signal, the second RF transmit signal, and the second RF receive signal) which can be used to direct the RF signal beams. The T/R controller 502 can select a plurality of beamforming settings 510 of the antenna groups 308A and 308B to direct the RF signal beams towards the vehicle detected by the camera 102.

Figure 6:
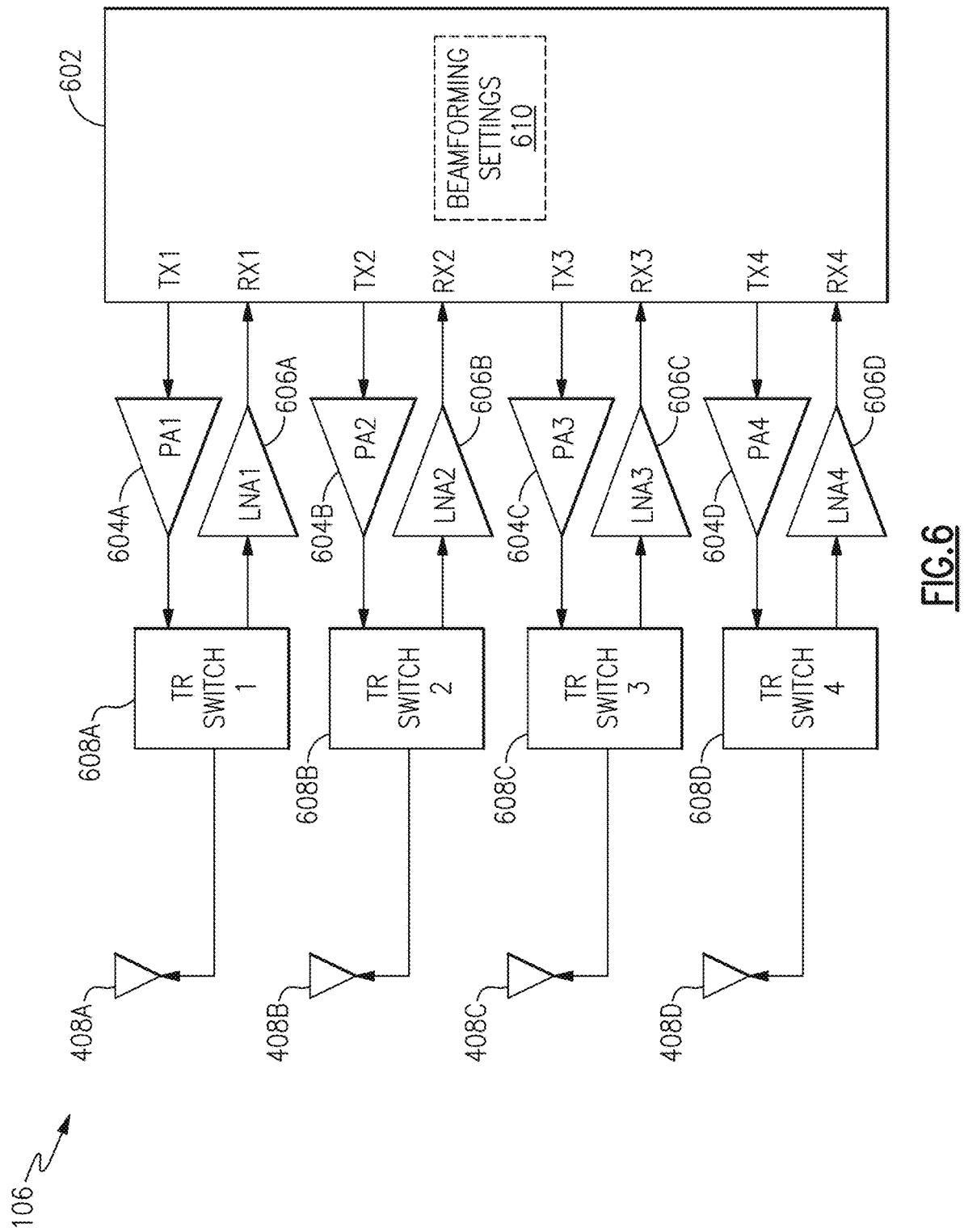
FIG. 6 is another example of control circuitry which can be used to drive the phased array of FIG. 4.

Similarly, FIG. 6 is another example of control circuitry 106 which can be used to drive the phased array 104 of FIG. 4 (represented as antenna groups 408A-408D in FIG. 6).

As shown in FIG. 6, the control circuitry 106 includes a T/R controller 602 including beamforming settings 610, a plurality of power amplifiers 604A-604D, a plurality of low noise amplifiers 606A-606D, and a plurality of T/R switches 608A-608D. The T/R switches 608A-608D are respectively connected to a corresponding one of the antenna groups 408A-408D (e.g., illustrated in FIG. 4). In certain implementations, the switches 608A-608D can be implemented together as a four transmit, four receive (4T4R) on a single chip, such as a 5.8 G front end module (FEM).

The control circuits 106 illustrated in FIGS. 5 and 6 provide example transceiver-based multi-transmit and multi-receive circuits which have a small enough footprint to be incorporated onto the PCB 300 and 400 while still keeping the size of the PCB 300 and 400 small enough to integrated into the camera 102. In some implementations, one or more of the control circuits 106 can be designed as a cascaded transceiver. For example, in one embodiment, the switches 608A-608D of the control circuit 106 of FIG. 6 can be implemented using two chip 2T2R cascaded chips, rather than a single 4T4R chip.

FIGS. 7A-12B illustrate a number of different embodiments of a phased array 104 and corresponding radiation patterns in accordance with aspects of this disclosure.

Figure 7A:
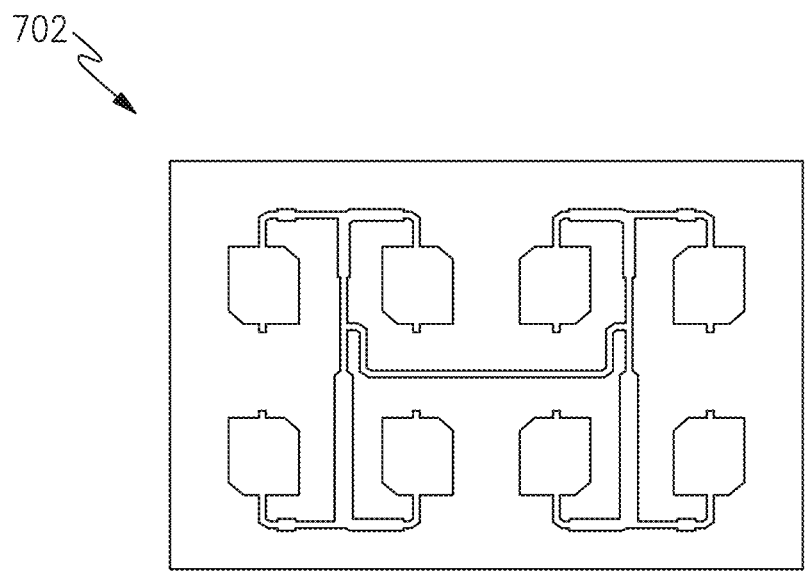
FIG. 7A illustrates an example phased array in accordance with aspects of this disclosure.
Figure 7B:
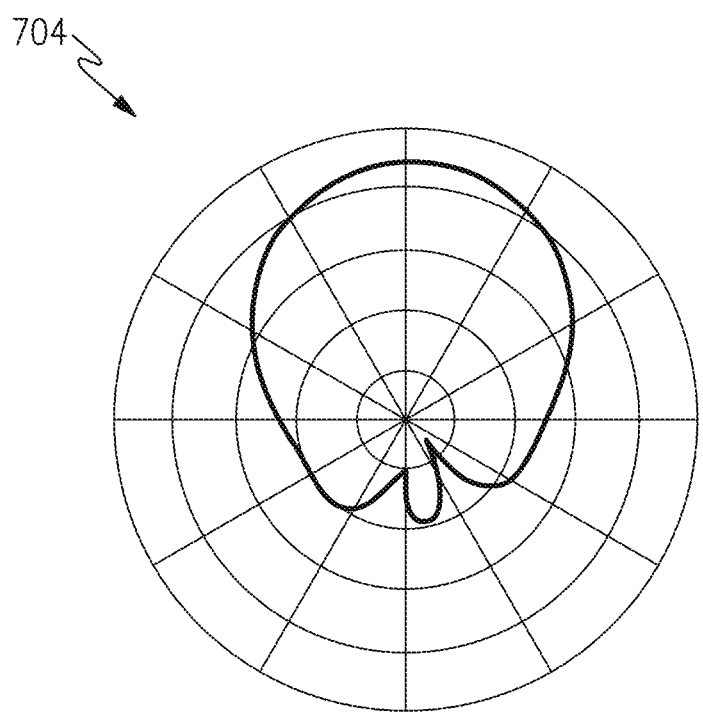
FIG. 7B illustrates the radiation pattern for the phased array of FIG. 7A.

FIG. 7A illustrates an example phased array 702 in accordance with aspects of this disclosure. In particular, the phase array 702 is formed in a rectangular pattern without a hole formed in the PCB. The individual elements of the phased array 702 may be similar to the other embodiments described herein. FIG. 7B illustrates the radiation pattern 704 for the phased array 702 of FIG. 7A.

Figure 8A:
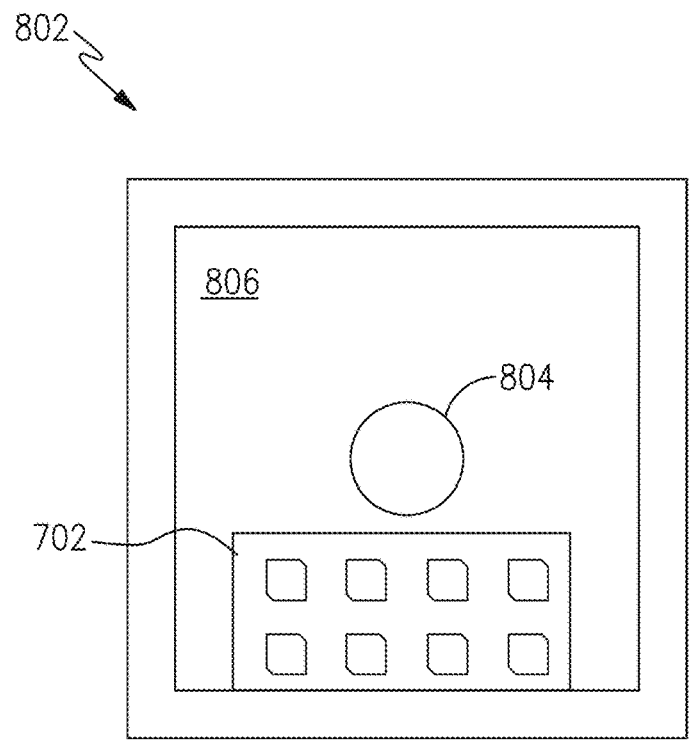
FIG. 8A illustrates an example phased array in accordance with aspects of this disclosure.
Figure 8B:
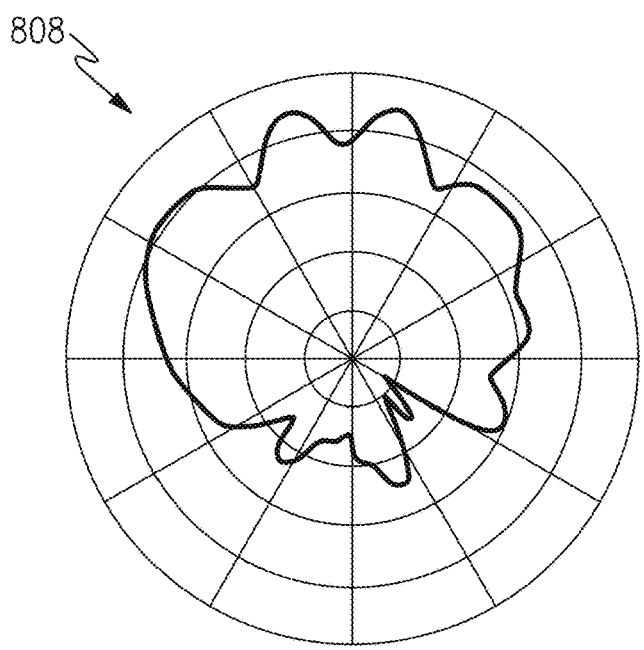
FIG. 8B illustrates the radiation pattern for the phased array of FIG. 8A.

FIG. 8A illustrates an example ETC device 802 in accordance with aspects of this disclosure. In particular, the ETC device 802 includes a phased array substantially similar to the phased array 702 of FIG. 7A placed next to a hole 804 in a PCB 806. The hole 804 in the PCB 806 may be arranged to be substantially aligned with a camera 102, thereby allowing light to enter the camera 102 via the hole 804. Due to the arrangement of the antennas on the phased array 702, there is not sufficient space between the antennas for the hole 804, and thus, the phase array 702 is placed adjacent to the hole 804 in the PCB 806. This leads to a larger overall size of the PCB 806, which may make the size of the PCB 806 too large to be integrated into the camera 102. FIG. 8B illustrates the radiation pattern 808 for the ETC device 802 of FIG. 8A.

In summary, FIGS. 7A-8B show that the phased array 702 formed in a rectangular patten may have a radiation pattern 704 that can be used for directional beamforming communications. However, as can be seen in FIG. 8A, due to the rectangular pattern of the phased array 702, the phased array 702 cannot be positioned on the PCB 806 such that the center of the phased array 702 aligns with a center of the camera 102 via the hole 804 in the PCB 806. Thus, the phased array 702 in this embodiment is placed at one side of the hole 804 and camera 102, which results in the phased array 702 being located closed to the metal housing of the camera 102. The metal housing may distort the radiation pattern 704, resulting the radiation pattern 808 shown in FIG. 8B.

Figure 9A:
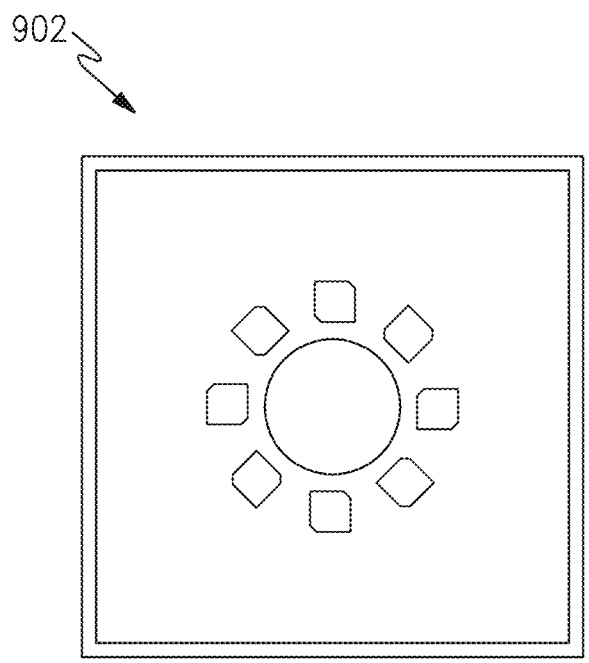
FIG. 9A illustrates an example phased array in accordance with aspects of this disclosure.
Figure 9B:
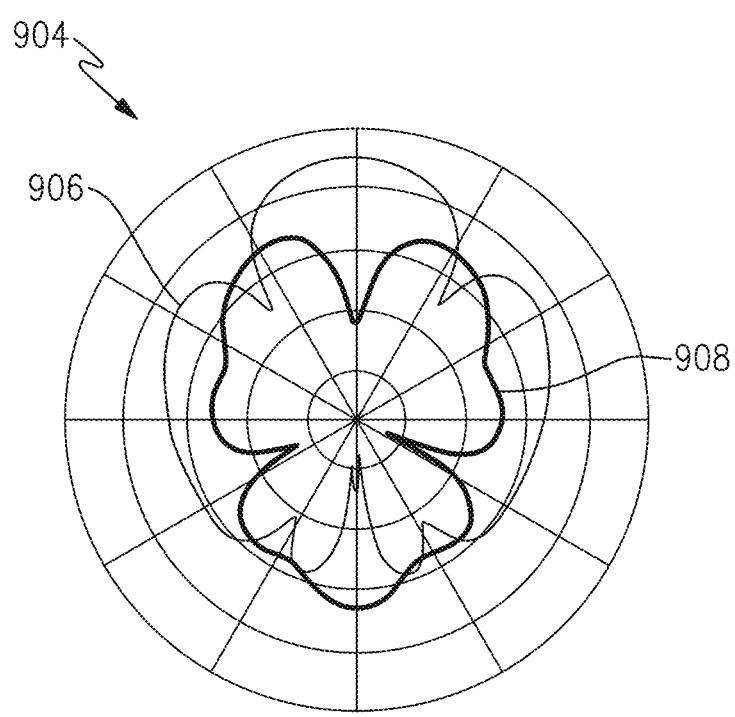
FIG. 9B illustrates the radiation pattern for the phased array of FIG. 9A.

FIG. 9A illustrates an example phased array 902 in accordance with aspects of this disclosure. In particular, the phased array 902 is substantially similar to the phased arrays 104 illustrated in each of FIGS. 3 and 4. In particular, the antennas of the phased array 902 are planned in a ring (e.g., substantially equidistance from the hole in the center of the PCB) and the angular orientation of the individual antennas are rotated around the hole. FIG. 9B illustrates the radiation pattern 904 for the phased array 902 of FIG. 9A. In particular, the illustrated radiation pattern 904 includes a Right Hand Circular Polarization (RHCP) radiation pattern 906 and a Left Hand Circular Radiation Polarization (LHCP) radiation pattern 908. In certain communication standards (e.g., the ETC standard in China), the RHCP is used for communication and the Cross Polar Discrimination (XPD) is required to be better than 15 dB. The XPD can be determined as the difference between RHCP and LHCP in ETC applications.

Figure 10A:
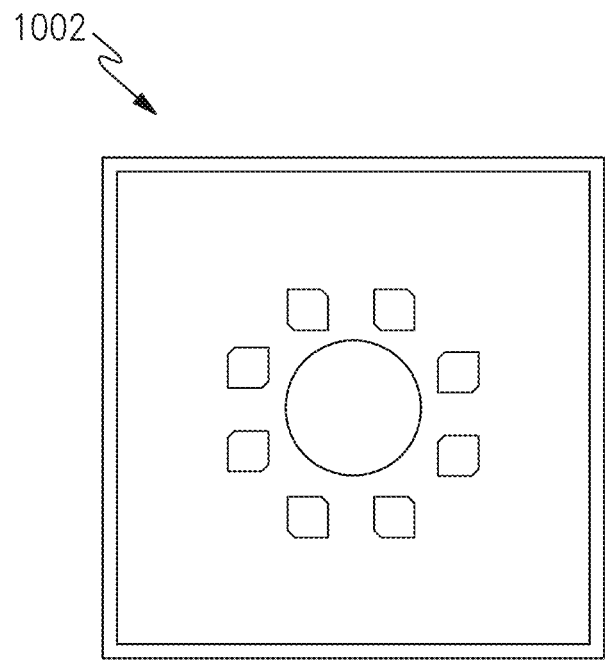
FIG. 10A illustrates an example phased array in accordance with aspects of this disclosure.
Figure 10B:
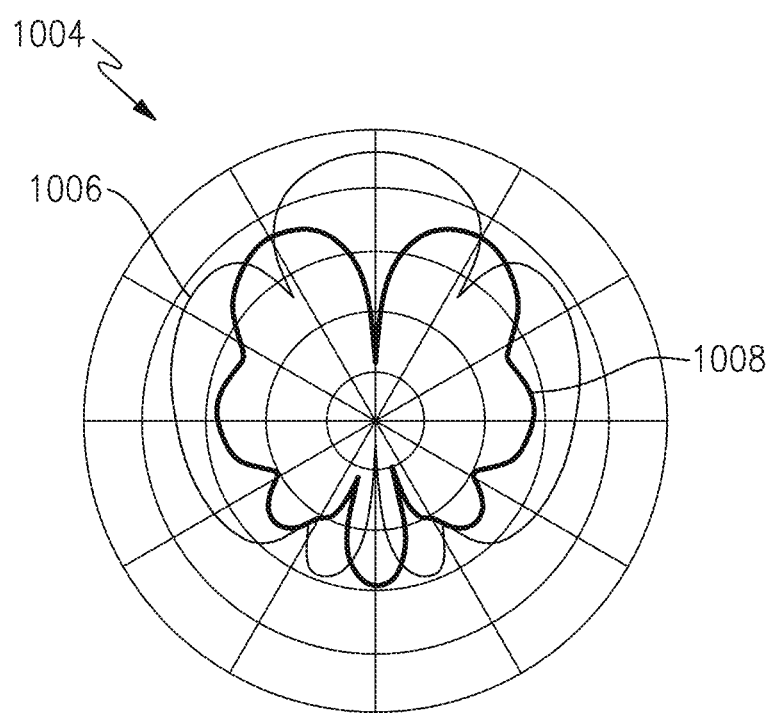
FIG. 10B illustrates the radiation pattern for the phased array of FIG. 10A.

FIG. 10A illustrates an example phased array 1002 in accordance with aspects of this disclosure. In particular, the phase array 1002 is a modified version of the phased arrays 104 illustrated in each of FIGS. 3 and 4 in which the antennas are arranged in a more linear ring compared to the embodiments of FIGS. 3 and 4. In particular, the antennas of the phased array 1002 are arranged to form a ring (e.g., substantially equidistance from the hole in the center of the PCB) without rotating the angular orientation of the individual antennas. FIG. 10B illustrates the radiation pattern 1004 for the phased array 1002 of FIG. 10A which includes a RHCP radiation pattern 1006 and a LHCP radiation pattern 1008.

Figure 11A:
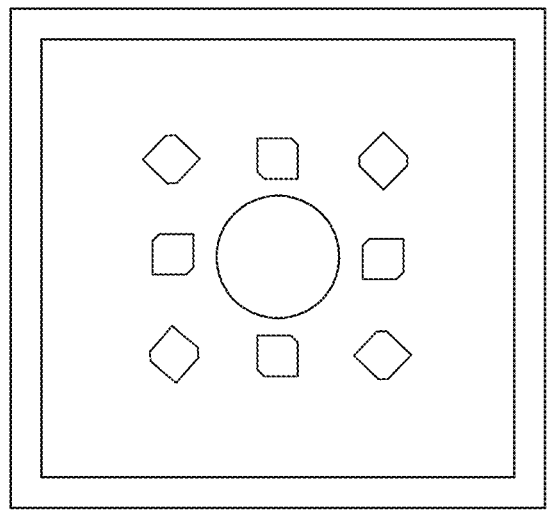
FIG. 11A illustrates an example phased array in accordance with aspects of this disclosure.
Figure 11B:
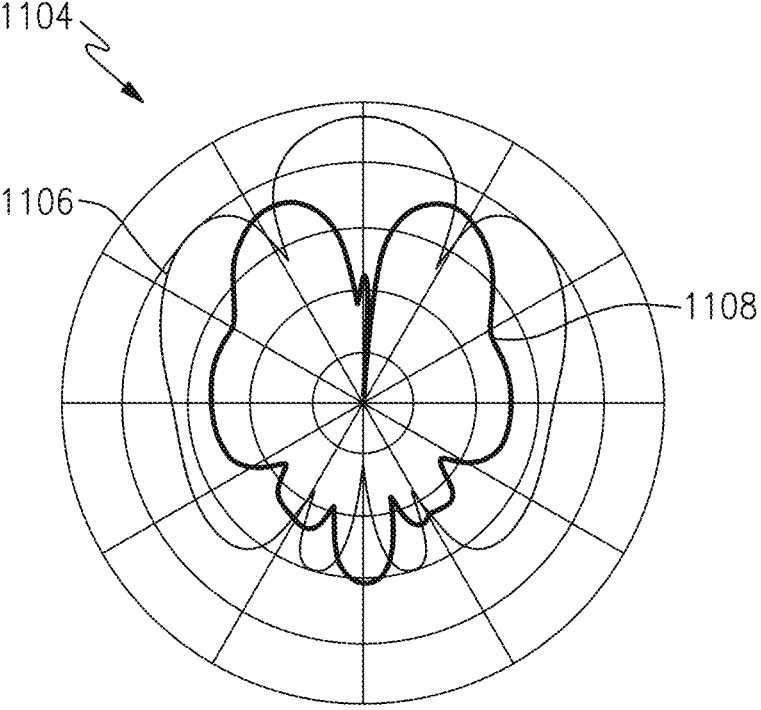
FIG. 11B illustrates the radiation pattern for the phased array of FIG. 11A.

FIG. 11A illustrates an example phased array 1102 in accordance with aspects of this disclosure. In particular, the phase array 1102 is a modified version of the phased arrays 104 illustrated in each of FIGS. 3 and 4. In particular, the antennas of the phased array 1102 are arranged to form a square (e.g., they are not substantially equidistance from the hole in the center of the PCB) and the angular orientation of the individual antennas are rotated around the hole. FIG. 11B illustrates the radiation pattern 1104 for the phased array 1102 of FIG. 11A which includes a RHCP radiation pattern 1106 and a LHCP radiation pattern 1108.

Figure 12A:
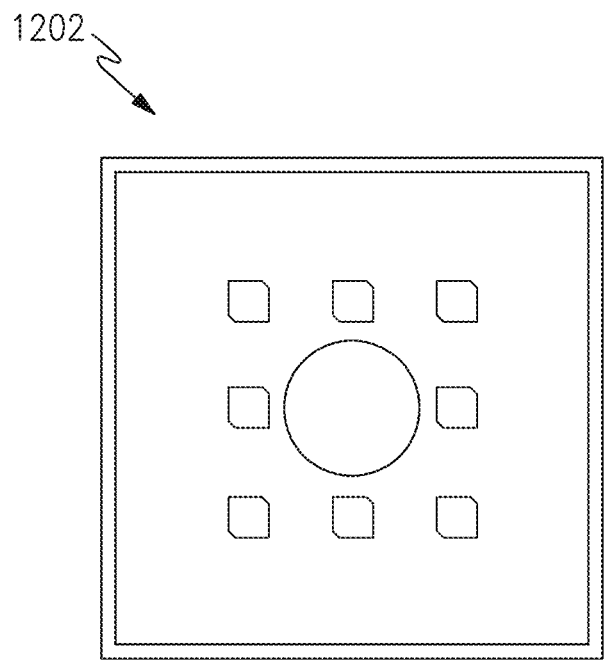
FIG. 12A illustrates an example phased array in accordance with aspects of this disclosure.
Figure 12B:
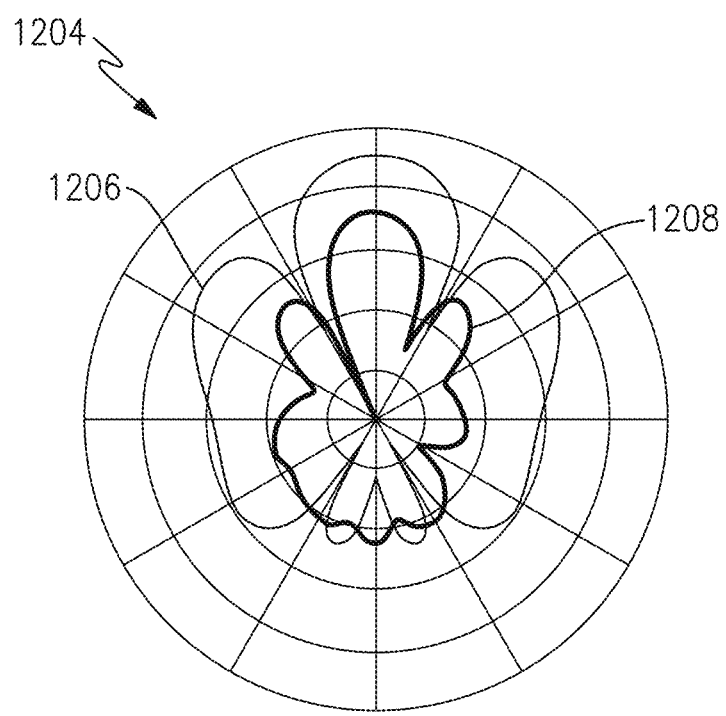
FIG. 12B illustrates the radiation pattern for the phased array of FIG. 12A.

FIG. 12 illustrates an example phased array 1202 in accordance with aspects of this disclosure. In particular, the phase array 1202 is a modified version of the phased arrays 104 illustrated in each of FIGS. 3 and 4. In particular, the antennas of the phased array 1102 are arranged to form a square (e.g., they are not substantially equidistance from the hole in the center of the PCB) without rotating the angular orientation of the individual antennas. FIG. 12B illustrates the radiation pattern 1204 for the phased array 1202 of FIG. 12A which includes a RHCP radiation pattern 1206 and a LHCP radiation pattern 1208.

The antenna axial ratio for the FIG. 12A embodiment may be comparatively worse (e.g., a higher axial ratio) when the control circuitry is placed within the inner ring of antennas compared to when the control circuitry is placed outside of the ring. The ETC Guobiao (GB) standard requires cross polarization discrimination of >15 dB at max gain direction. In general, the axial ratio may be better for circular phased array shapes (e.g., the phased arrays 902 and 1002 of FIGS. 9A and 10A) than for rectangular phased array shapes (e.g., the phased arrays 1102 and 1202 of FIGS. 11A and 12A).

Figure 13:
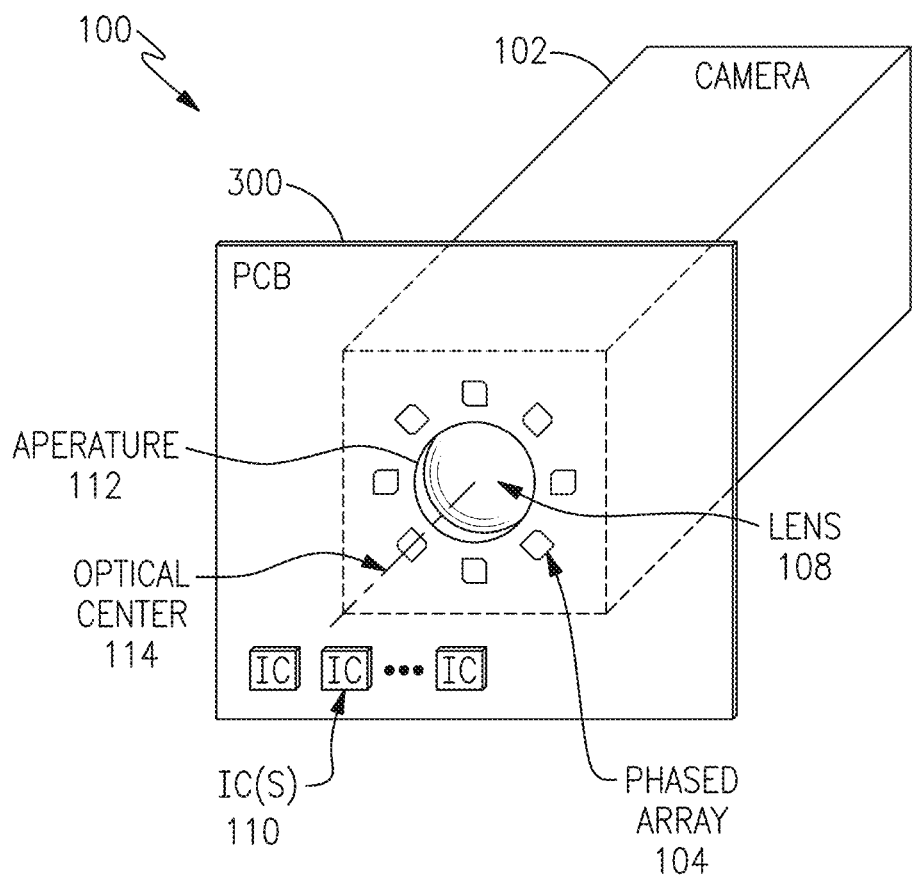
FIG. 13 illustrates an embodiment of an ETC system having a phased array integrated with a camera in accordance with aspects of this disclosure.

FIG. 13 illustrates an embodiment of an ETC system 100 having a phased array 104 integrated with a camera 102 in accordance with aspects of this disclosure. As shown in FIG. 13, the ETC system includes a PCB 300 which is integrated with a camera 102. The PCB 300 has a number of components arranged thereon, including the phased array 104, and one or more integrated circuits (ICs) 110. An aperture 112 or hole is formed in the PCB 300 and the aperture 112 overlaps a lens 108 of the camera 102. The lens 108 has an optical center 114 which is substantially aligned (e.g., coaxial) with the aperture 112. The optical center 114 is also substantially aligned with a phase center of the phased array 104. The one or more ICs 110 may include circuitry configured to implement the control circuitry 106, such as the control circuitry 106 illustrated in FIGS. 5 and 6.

Figure 14:
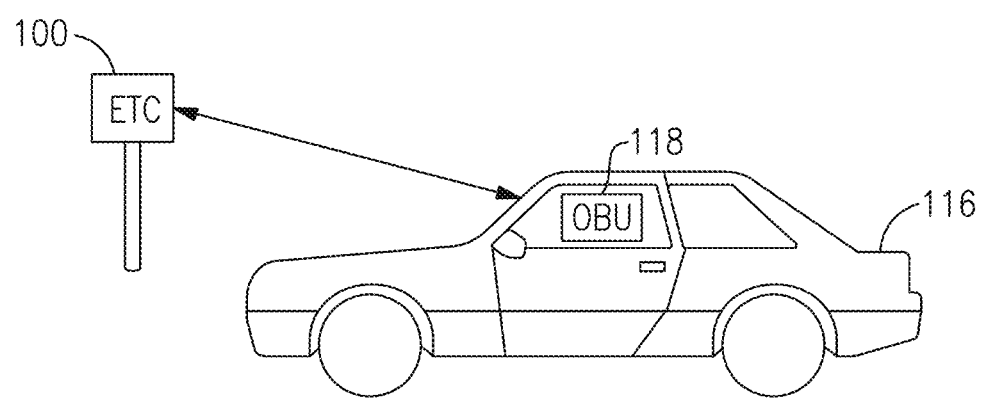
FIG. 14 illustrates an example environment in which an ETC system can be installed in accordance with aspects of this disclosure.

FIG. 14 illustrates an example environment in which an ETC system 100 can be installed in accordance with aspects of this disclosure. The ETC system 100 can be configured to communicate with an OBU 118 installed on a vehicle 116. As described herein, the ETC system 100 can use the integrated camera to detect the location of the vehicle 116, adjust the antenna array to direct RF communication in the direction of the vehicle, and communication with the OBU 118 of the vehicle 116 using the adjusted antenna array.

CONCLUSION

Aspects of this disclosure can be implemented in various electronic devices. Examples of the electronic devices can include, but are not limited to, consumer electronic products, parts of the consumer electronic products, electronic test equipment, vehicular electronics systems, etc. Examples of the electronic devices can include, but are not limited to, computing devices, communications devices, electronic household appliances, automotive electronics systems, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a Table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An electronic toll charge (ETC) system, comprising:
a camera comprising a lens and configured to capture an image indicative of a position of a vehicle;
a plurality of antennas formed in a ring around the lens of the camera; and
control circuitry configured to:
determine the position of the vehicle based on the image captured by the camera,
select a plurality of beamforming settings of the antennas based on the position of the vehicle, and
wirelessly communicate with an on board device (OBU) of the vehicle with the selected beamforming settings of the antennas, wherein the plurality of antennas are operable to form a transmit beam and a receive beam to communicate with the vehicle based on the plurality of beamforming settings.

2. The ETC system of claim 1, wherein an optical center of the camera and a center of the ring formed by the plurality of antennas coincide.

3. The ETC system of claim 1, wherein selecting the plurality of beamforming settings comprises setting a gain and a phase for a radio frequency (RF) signal provided to two or more antennas of the plurality of antennas and setting a gain and a phase for RF signals received from the two or more antennas.

4. The ETC system of claim 1, wherein the antennas are divided into a plurality of antenna groups, the antennas within a first one of the antenna groups are electrically connected together, and the control circuitry is further configured to control the antennas within the first antenna group together.

5. The ETC system of claim 4, wherein the control circuit comprises:
a first power amplifier,
a first low noise amplifier,
a first switch selectively coupling the first antenna group to the first power amplifier and the first low noise amplifier, and
a controller configured to provide a transmit radio frequency (RF) signal to the first antenna group via the first power amplifier and receive a receive RF signal from the first antenna group via the low noise amplifier.

6. The ETC system of claim 5, wherein the controller is further configured to adjust a gain and a phase of each of the transmit RF signal and the receive RF signal for beamforming.

7. The ETC system of claim 1, further comprising:
a printed circuit board (PCB) on which the plurality of antennas are formed, the PCB including a hole arranged at a center of the ring formed by the antennas, wherein the hole in the PCB is coaxial with the camera lens.

8. The ETC system of claim 1, wherein an angular orientation of each of the antennas is rotated based on a position of the corresponding antenna within the ring.

9. The ETC system of claim 1, wherein the ring is substantially circular.

10. The ETC system of claim 1, wherein the wireless communication with the OBU comprises charging a payment account associated with a user of the OBU for payment.

11. A phased array, comprising:
a printed circuit board (PCB) having a hole configured to be aligned with a lens of a camera;
a plurality of antennas formed on the PCB and formed in a ring around the hole; and
control circuitry configured to:
determine the position of a vehicle based on an image captured by the camera,
select a plurality of beamforming settings of the antennas based on the position of the vehicle, and
wirelessly communicate with an on board device (OBU) of the vehicle with the selected beamforming settings of the antennas,
wherein the plurality of antennas are operable to form a transmit beam and a receive beam to communicate with the vehicle based on the plurality of beamforming settings.

12. The phased array of claim 11, wherein an optical center of the camera and a center of the ring formed by the plurality of antennas coincide.

13. The phased array of claim 11, wherein selecting the plurality of beamforming settings comprises setting a gain and a phase for a radio frequency (RF) signal provided to two or more antennas of the plurality of antennas and setting a gain and a phase for RF signals received from the two or more antennas.

14. The phased array of claim 11, wherein the antennas are divided into a plurality of antenna groups, the antennas within a first one of the antenna groups are electrically connected together, and the control circuitry is further configured to control the antennas within the first antenna group together.

15. The phased array of claim 14, wherein the control circuit comprises:
a first power amplifier,
a first low noise amplifier,
a first switch selectively coupling the first antenna group to the first power amplifier and the first low noise amplifier, and
a controller configured to provide a transmit radio frequency (RF) signal to the first antenna group via the first power amplifier and receive a receive RF signal from the first antenna group via the low noise amplifier.

16. The phased array of claim 15, wherein the controller is further configured to adjust a gain and phase of each of the transmit RF signal and the receive RF signal for beamforming.

17. A method for wireless electronic toll charge (ETC) communication, the method comprising:
receiving an image indicative of a position of a vehicle captured by a camera comprising a lens;
determining the position of the vehicle based on the image;
selecting a plurality of beamforming settings of a plurality of antennas based on the position of the vehicle, the plurality of antennas formed in a ring around the lens of the camera; and
wirelessly communicating with an on board device (OBU) of the vehicle with the selected beamforming settings of the antennas, including using the plurality of antennas to form a transmit beam and a receive beam to communicate with the vehicle based on the plurality of beamforming settings.

18. The method of claim 17, wherein an optical center of the camera and a center of the ring formed by the plurality of antennas coincide.

19. The method of claim 17, wherein selecting the plurality of beamforming settings comprises setting a gain and a phase for a radio frequency (RF) signal provided to two or more antennas of the plurality of antennas and setting a gain and a phase for RF signals received from the two or more antennas.

20. The method of claim 19, wherein the antennas are divided into a plurality of antenna groups, the antennas within a first one of the antenna groups are electrically connected together, the method further comprising controlling the antennas within the first antenna group together.

* * * * *